(12) United States Patent
Maeda et al.

(10) Patent No.: US 12,187,114 B2
(45) Date of Patent: Jan. 7, 2025

(54) SHUTTER DEVICE FOR VEHICLE

(71) Applicant: DENSO CORPORATION, Kariya (JP)

(72) Inventors: Akihiro Maeda, Kariya (JP); Yukio Shidara, Kariya (JP)

(73) Assignee: DENSO CORPORATION, Kariya (JP)

( * ) Notice: Subject to any disclaimer, the term of this patent is extended or adjusted under 35 U.S.C. 154(b) by 349 days.

(21) Appl. No.: 17/582,199

(22) Filed: Jan. 24, 2022

(65) Prior Publication Data

US 2022/0144077 A1    May 12, 2022

Related U.S. Application Data

(63) Continuation of application No. PCT/JP2020/027365, filed on Jul. 14, 2020.

(30) Foreign Application Priority Data

Jul. 26, 2019 (JP) ................. 2019-137737

(51) Int. Cl.
*B60K 11/08* (2006.01)
*F01P 11/10* (2006.01)

(52) U.S. Cl.
CPC ............. *B60K 11/085* (2013.01); *F01P 11/10* (2013.01)

(58) Field of Classification Search
CPC ................. F01P 11/10; B60K 11/06
See application file for complete search history.

(56) References Cited

U.S. PATENT DOCUMENTS

2012/0241128 A1*   9/2012  Vacca ................. B60K 11/085
                                                        165/44
2021/0138892 A1    5/2021  Mitsuhashi et al.

FOREIGN PATENT DOCUMENTS

| JP | 2012001184 A | 1/2012 |
|----|--------------|--------|
| JP | 2012224153 A | 11/2012 |
| JP | 2013505873 A | 2/2013 |
| JP | 2019100389 A | 6/2019 |
| JP | 2020015426 A | 1/2020 |

* cited by examiner

*Primary Examiner* — Kevin A Lathers
(74) *Attorney, Agent, or Firm* — Harness, Dickey & Pierce, P.L.C.

(57) ABSTRACT

A shutter device includes a frame, an opening-closing portion, and a protrusion. The frame is disposed between a first heat exchanger and a second heat exchanger and defines an inner space through which air introduced from a grill opening of a vehicle flows in an airflow direction. Each of the first heat exchanger and a second heat exchanger has a core and a remaining portion other than the core. The opening-closing portion is configured to selectively open and close the inner space of the frame. The protrusion protrudes, in a direction parallel to the airflow direction, from the frame toward the remaining portion of at least one of the first heat exchanger or the second heat exchanger.

16 Claims, 9 Drawing Sheets

SHUTTER DEVICE FOR VEHICLE

CROSS REFERENCE TO RELATED APPLICATION

The present application is a continuation application of International Patent Application No. PCT/JP2020/027365 filed on Jul. 14, 2020, which designated the U.S. and claims the benefit of priority from Japanese Patent Application No. 2019-137737 filed on Jul. 26, 2019. The entire disclosures of all of the above applications are incorporated herein by reference.

TECHNICAL FIELD

A present disclosure relates to a shutter device for a vehicle.

BACKGROUND

In a vehicle, air introduced from a grill opening into an engine compartment is used to dissipate heat from a radiator through which an engine cooling water flows and dissipate heat from a condenser of a vehicular air-conditioner. Such vehicle may include a shutter device that can temporarily block an airflow from the grill opening to the engine compartment.

SUMMARY

A shutter device of a vehicle according to one aspect of the present disclosure includes a frame, an opening-closing portion, and a protrusion. The frame is disposed between a first heat exchanger and a second heat exchanger and defines an inner space through which air introduced from a grill opening of a vehicle flows in an airflow direction. Each of the first heat exchanger and the second heat exchanger includes a core in which heat exchange is performed and a remaining portion other than the core. The opening-closing portion is configured to selectively open and close the inner space of the frame. The protrusion protrudes from the frame toward the remaining portion of at least one of the first heat exchanger and the second heat exchanger.

According to this configuration, when the frame is elastically deformed due to vibrations of the vehicle or the like, the protrusion contacts with the remaining portion of at least one of the first heat exchanger and the second heat exchanger. Thus, the frame is restricted from being further deformed. Further, since the frame is restricted from being deformed, the blades that are rotatably supported by the frame are also less likely to be deformed. As a result, it is possible to prevent the frame and the blades from coming into contact with the core of the heat exchanger.

DESCRIPTION OF EMBODIMENTS

Figure 1:
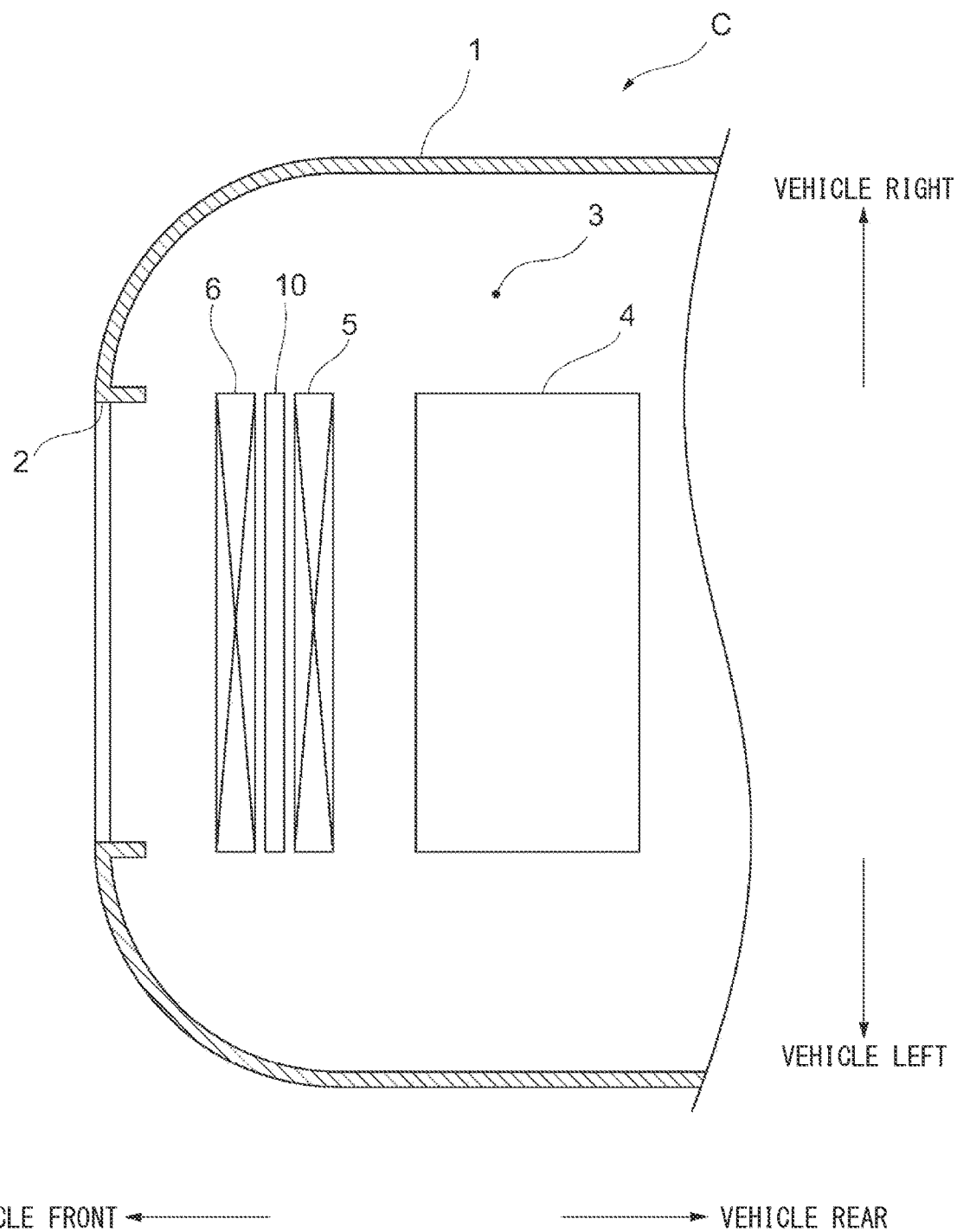
FIG. 1 is a diagram schematically illustrating a front part of a vehicle.

To begin with, examples of relevant techniques will be described.

In a vehicle, air introduced from a grill opening into an engine compartment is used to dissipate heat from a radiator through which an engine cooling water flows and dissipate heat from a condenser of a vehicular air-conditioner. Such vehicle may include a shutter device that can temporarily block an airflow from the grill opening to the engine compartment.

The shutter device includes a square frame and multiple blades arranged in an inner space defined by the frame. The blades are arranged in a vertical direction in the inner space of the frame. Each of the blades extends in a horizontal direction and has shaft portions at both ends in the horizontal direction. The shaft portions of each of the blades are slidably inserted into insertion holes defined in the frame. The insertion holes pass through the frame between the inner wall and the outer wall of the frame. The shaft portions of the blades and the insertion holes of the frame form bearing structures. With the bearing structures, the blades are rotatably supported by the frame. The inner space defined by the frame is opened or closed by the rotational movement of the blades. When the blades are open, air can pass through the shutter device and when the blades are closed, an airflow through the frame is blocked.

In recent years, a space in the engine compartment of the vehicle is decreasing because the number of devices installed in the engine compartment is increasing. Thus, there is a demand to reduce a space in which the shutter device of the vehicle is mounted. To satisfy this demand, the inventors consider arranging the shutter device in a narrow gap defined between two heat exchangers such as a radiator and a condenser. When arranging the shutter device in such a space, it is essential to reduce a thickness of the shutter device.

In contrast, when the thickness of the shutter device is reduced, the rigidity of the shutter device is lowered. When the rigidity of the shutter device is reduced and when vibrations of the vehicle are transmitted to the shutter device, the shutter device may be elastically deformed. As a result, the frame or the blades of the shutter device may come into contact with the heat exchangers arranged in front of and behind the shutter device. Each of the heat exchangers includes a core where heat exchange is performed. The core is formed, for example, by a stacking structure of multiple tubes. The strength of the core having such structure is weaker than that of a remaining portion of the heat exchanger other than the core. Thus, when the frame and/or the blades come into contact with the core of the heat exchanger, the core may be damaged.

It is objective of the present disclosure to provide a shutter device of a vehicle that is disposed between two heat exchangers and that can be restricted from coming into contact with the cores of the heat exchangers.

A shutter device of a vehicle according to one aspect of the present disclosure includes a frame, an opening-closing portion, and a protrusion. The frame is disposed between a first heat exchanger and a second heat exchanger and defines an inner space through which air introduced from a grill opening of a vehicle flows in an airflow direction. Each of the first heat exchanger and the second heat exchanger includes a core in which heat exchange is performed and a remaining portion other than the core. The opening-closing portion is configured to selectively open and close the inner space of the frame. The protrusion protrudes from the frame toward the remaining portion of at least one of the first heat exchanger and the second heat exchanger.

According to this configuration, when the frame is elastically deformed due to vibrations of the vehicle or the like, the protrusion contacts with the remaining portion of at least one of the first heat exchanger and the second heat exchanger. Thus, the frame is restricted from being further deformed. Further, since the frame is restricted from being deformed, the blades that are rotatably supported by the frame are also less likely to be deformed. As a result, it is possible to prevent the frame and the blades from coming into contact with the core of the heat exchanger.

Hereinafter, embodiments of a shutter device of a vehicle are described with reference to the drawings. In order to facilitate the understanding, the same reference numerals are attached to the same constituent elements in each drawing where possible, and redundant explanations are omitted.

First Embodiment

First, a schematic configuration of a vehicle equipped with a shutter device of the first embodiment will be described.

As shown in FIG. 1, a grill opening 2 is defined in a front of a body 1 of the vehicle C. The grill opening 2 is defined to introduce air in front of the vehicle body 1 into an engine compartment 3. In the engine compartment 3, a radiator 5 and a condenser 6 are arranged in addition to an engine 4 of the vehicle C. The radiator 5 is configured to perform heat exchange between a cooling water for the engine 4 and air introduced through the grill opening 2 to cool the cooling water. The condenser 6 is a component of a refrigeration cycle for an air-conditioner mounted in the vehicle C. The condenser 6 is configured to perform heat exchange between a refrigerant circulating through the refrigeration cycle and air introduced through the grill opening 2 to cool the refrigerant. The radiator 5 and the condenser 6 are arranged between the grill opening 2 and the engine 4. In the present embodiment, the condenser 6 corresponds to a first heat exchanger arranged upstream in an airflow direction Y. The radiator 5 corresponds to a second heat exchanger arranged downstream of the first heat exchanger in the airflow direction Y.

A shutter device 10 is disposed between the radiator 5 and the condenser 6. The shutter device 10 is configured to temporarily block an airflow from the grill opening 2 into the engine compartment 3. The shutter device 10 can assist an early warm-up operation of the engine 4 during a cold start of the engine 4 by temporarily blocking the airflow from the grill opening 2 into the engine compartment 3. Further, the shutter device 10 can improve an aerodynamic performance of the vehicle C by temporarily blocking the airflow into the engine compartment 3 of the vehicle C when the vehicle C travels at high speed.

Next, the specific structure of the shutter device 10 will be described.

Figure 2:
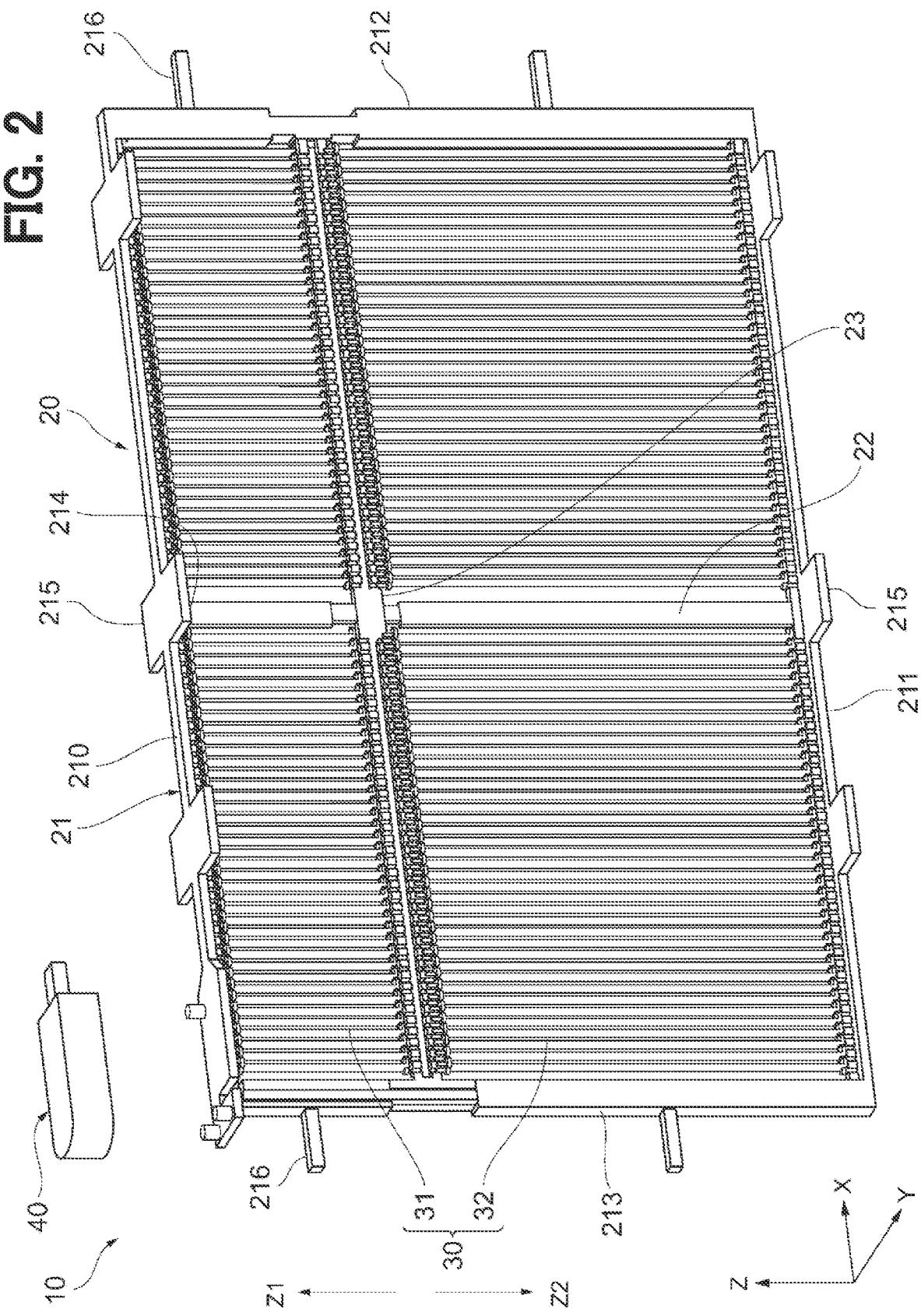
FIG. 2 is a perspective view illustrating a shutter device of the first embodiment.

As shown in FIG. 2, the shutter device 10 includes a frame 20, multiple blades 30, and an actuator 40.

The frame 20 includes a first frame body 21, a second frame body 22, and a third frame body 23. The first frame body 21 is formed into a rectangular shape. The second frame body 22 and the third frame body 23 are arranged to cross with each other in an inner space defined by the first frame body 21.

The first frame body 21 has an upper frame piece 210, a lower frame piece 211, a right frame piece 212, and a left frame piece 213. Air introduced through the grill opening 2 shown in FIG. 1 flows through the inner space defined by the first frame body 21.

Hereinafter, the longitudinal directions of the upper frame piece 210 and the lower frame piece 211 are also referred to as an X-axis direction, and the longitudinal directions of the right frame piece 212 and the left frame piece 213 are also referred to as a Z-axis direction. Further, a Z1 direction, which is one direction in the Z-axis direction, is referred to as "an upward direction", and a Z2 direction, which is the other direction in the Z-axis direction, is referred to as "a downward direction". Further, a direction perpendicular to both the X-axis direction and the Z-axis direction is also referred to as a Y-axis direction. Since the Y-axis direction corresponds to the airflow direction, hereinafter, the Y-axis direction is also referred to as "an airflow direction Y".

The second frame body 22 is provided to reinforce the first frame body 21. The third frame body 23 is provided to hold the blades 30 and reinforce the first frame body 21. The second frame body 22 is disposed to extend between the upper frame piece 210 and the lower frame piece 211 of the first frame body 21. As shown in FIG. 2, the third frame body 23 is disposed to extend between the right frame piece 212 and the left frame piece 213 of the first frame body 21. The inner space defined by the first frame body 21 is divided into four regions by the second frame body 22 and the third frame body 23.

The blades 30 are arranged in the four regions defined in the inner space of the frame 20. In the four regions of the frame 20, the blades 30 are arranged to have a longitudinal direction in the Z-axis direction and are arranged side by side in the X-axis direction. Hereinafter, for convenience, some of the blades 30 arranged between the upper frame piece 210 of the first frame body 21 and the third frame body 23 are referred to "upper blades 31" and the others of the blades 30 arranged between the lower frame piece 211 and the third frame body 23 are referred to as "lower blades 32".

The upper ends of the upper blades 31 are rotatably supported by the upper frame piece 210 of the first frame body 21, and the lower ends of the upper blades 31 are rotatably supported by the third frame body 23. The upper ends of the lower blades 32 are rotatably supported by the third frame body 23, and the lower ends of the lower blades 32 are rotatably supported by the lower frame piece 211.

Figure 3:
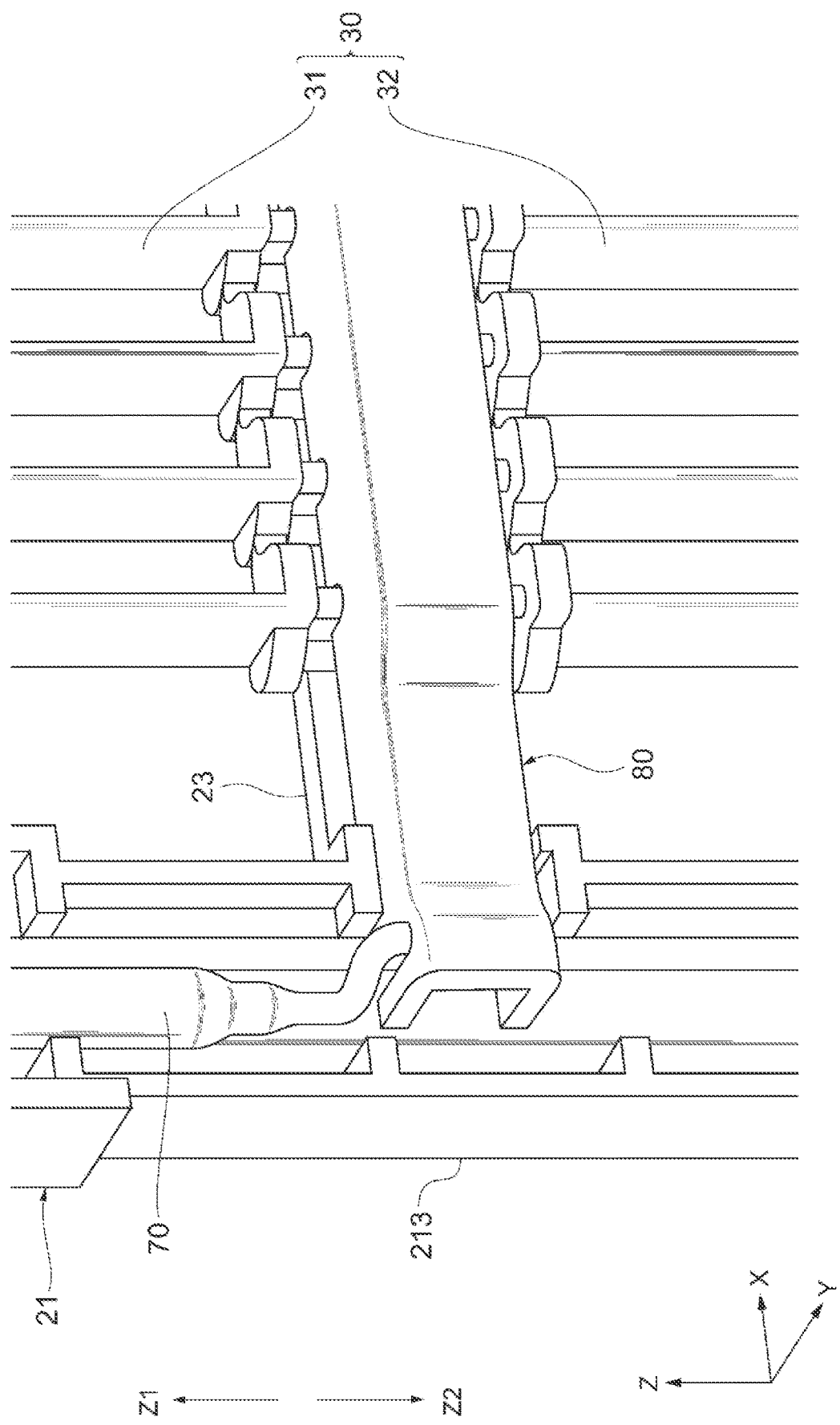
FIG. 3 is an enlarged view of a portion of the shutter device of the first embodiment around a connection structure between a link member and a shaft.

As shown in FIG. 3, a link member 80 is further attached to the third frame body 23. The link member 80 extends in the X-axis direction. The lower ends of the upper blades 31 and the upper ends of the lower blades 32 are connected to the link member 80.

A shaft 70 is arranged on the left frame piece 213 of the first frame body 21. The shaft 70 extends upward from a connecting portion between the third frame body 23 and the left frame piece 213. The upper end of the shaft 70 is connected to the actuator 40 shown in FIG. 2. In FIG. 2, illustrations of the link member 80 and the shaft 70 are omitted.

The actuator 40 is fixed at an upper portion of one end of the upper frame piece 210 with screws or the like. The actuator 40 rotates the shaft 70 based on the supply of electric power. When the shaft 70 rotates, the link member 80 is displaced in the X-axis direction relative to the third frame body 23, so that rotational force is transmitted from the link member 80 to the upper blades 31 and the lower blades 32. As a result, the upper blades 31 and the lower blades 32 are rotated to open or close the inner space defined by the first frame body 21. Specifically, when the blades 30 are open, gaps are defined between the blades 30, so that air can flow into the engine compartment 3 through the grill opening 2 and the gaps. When the blades 30 are closed, the gaps between the blades 30 are closed, so that the airflow from the grill opening 2 into the engine compartment 3 is temporarily blocked. As described above, in the present embodiment, the blades 30 correspond to an opening-closing portion configured to selectively open and close the inner space defined by the frame 20.

As shown in FIG. 2, each of the upper frame piece 210 and the lower frame piece 211 of the first frame body 21 includes multiple first protrusions 214 and multiple second protrusions 215. The first protrusions 214 protrude from the upper frame piece 210 or the lower frame piece 211 in the airflow direction Y. The second protrusions 215 protrude from the upper frame piece 210 or the lower frame piece 211 in a direction opposite to the airflow direction Y. Each of the first protrusions 214 and the second protrusions 215 has a rectangular shape.

Each of the right frame piece 212 and the left frame piece 213 of the first frame body 21 includes third protrusions 216. The third protrusions 216 protrude from the right frame piece 212 or the left frame piece 213 in a direction parallel to the X-axis direction, in other words, in a direction perpendicular to the airflow direction Y. Each of the third protrusions 216 also has a rectangular shape.

In the frame 20, the first protrusions 214, the second protrusions 215, and the third protrusions 216 are in contact with the radiator 5 and the condenser 6 to restrict the frame bodies 21 to 23 from being deformed.

Next, the deformation restricting structure of the frame 20 will be described in detail. First, the structures of the radiator 5 and the condenser 6 will be described.

Figure 4:
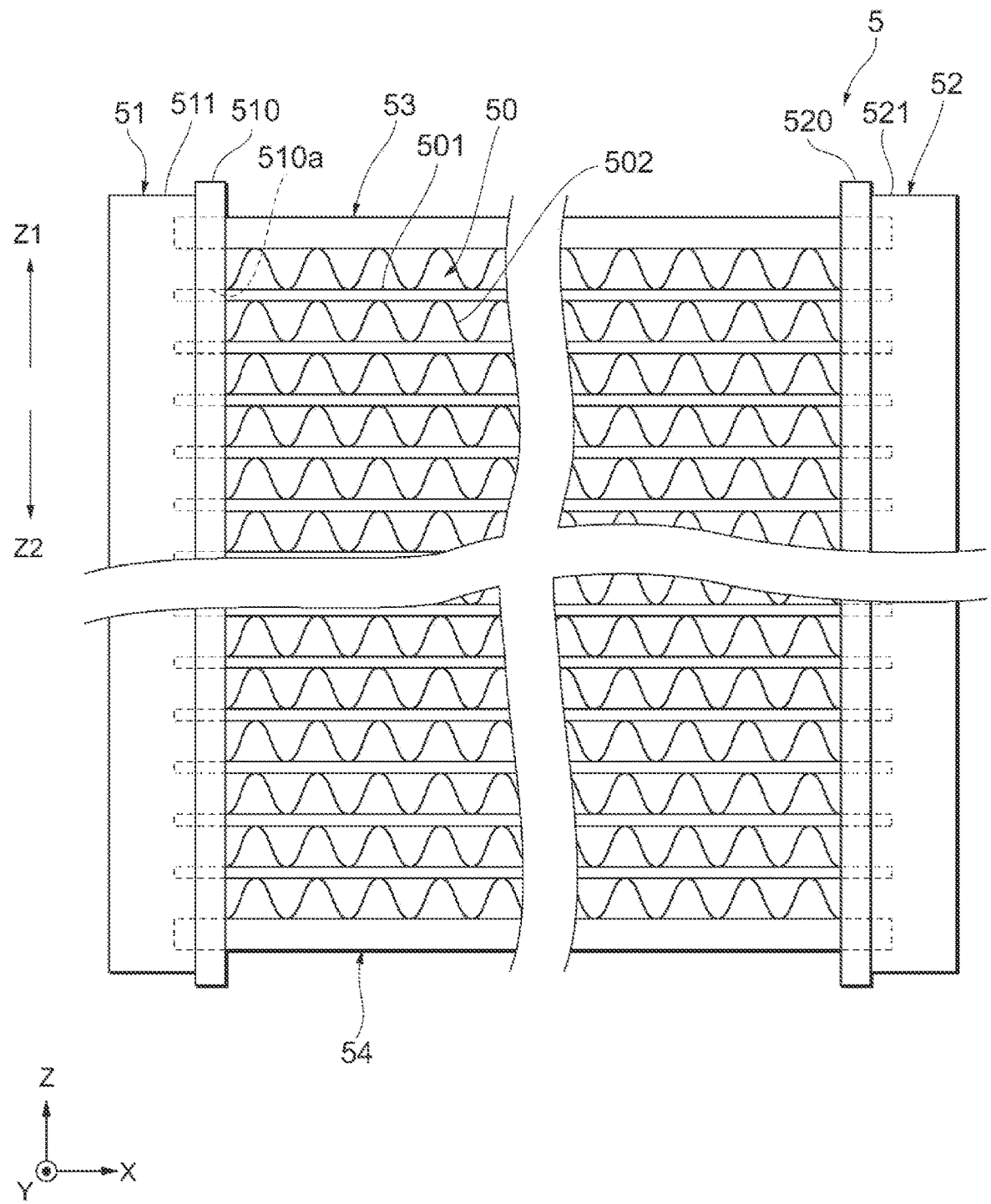
FIG. 4 is a front view of a radiator of the first embodiment.

As shown in FIG. 4, the radiator 5 includes a core 50, a first tank 51, a second tank 52, a first side plate 53, and a second side plate 54. In the radiator 5, the first tank 51, second tank 52, the first side plate 53, and the second side plate 54 correspond to a remaining portion other than the core 50.

The core 50 is composed of multiple tubes 501 and multiple fins 502. The core 50 is a portion where heat exchange between a cooling water flowing through the tubes 501 and air flowing outside the tubes 501 is performed. In this embodiment, the cooling water and the air correspond to fluids.

The tubes 501 are stacked with each other in the Z-axis direction at predetermined intervals. Therefore, in the present embodiment, the Z-axis direction corresponds to a tube stacking direction. The tubes 501 are flat tubes and extend in the X-axis direction. The inner spaces of the tubes 501 constitute passages through which the cooling water flows. Air flows through the gaps defined between adjacent ones of the tubes 501.

The fins 502 are arranged in the gaps defined between adjacent ones of the tubes 501. The fins 502 are so-called corrugated fins formed by bending thin metal plates into wavy shapes. The fins 502 improve the heat exchange performance of the radiator 5 by increasing the heat transfer area for air.

The first tank 51 is connected to one ends of the tubes 501. The first tank 51 is composed of a core plate 510 and a tank member 511.

Figure 5:
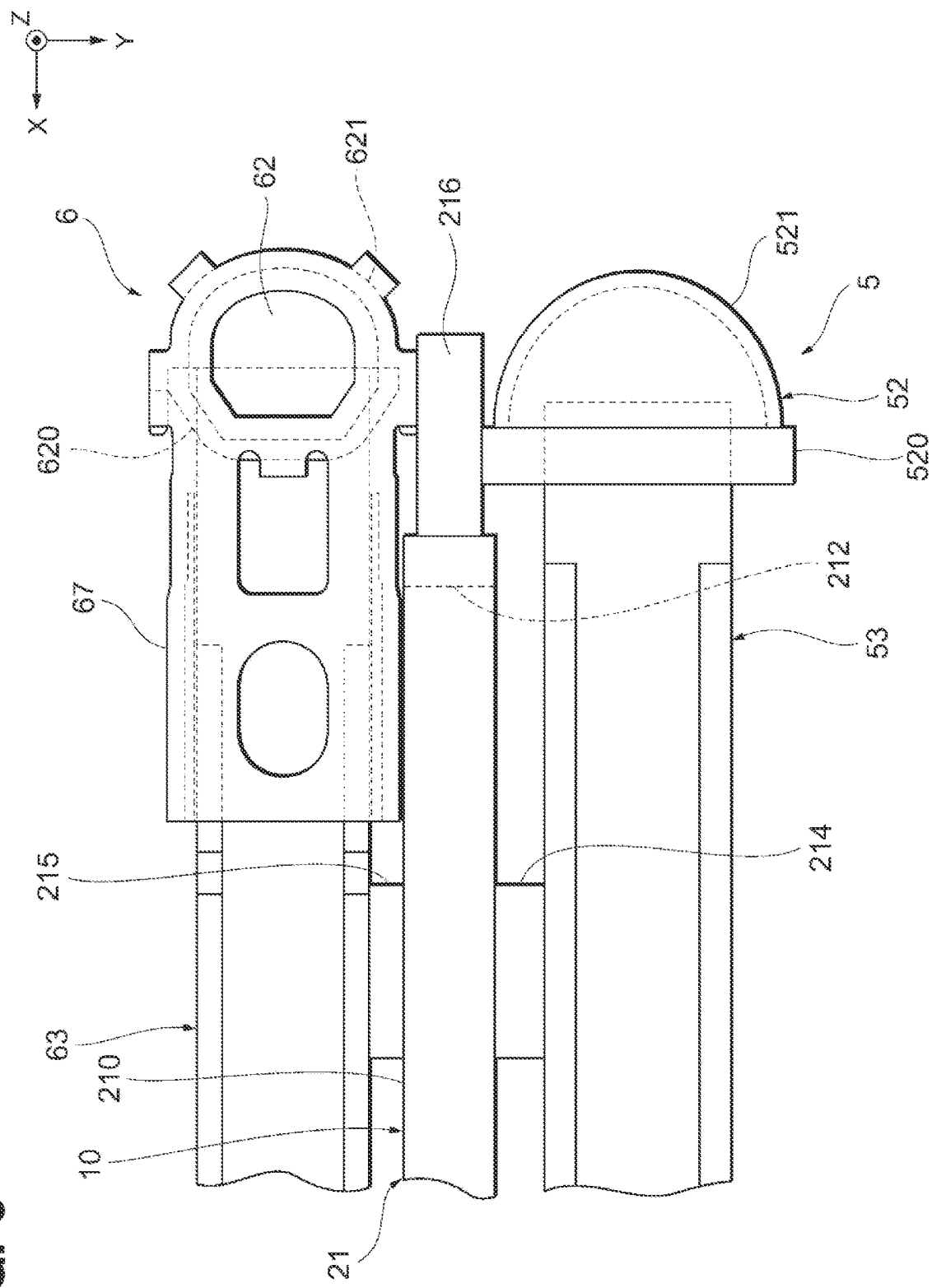
FIG. 5 is a plan view of the radiator, a condenser, and a shutter device of the first embodiment.

As shown in FIGS. 4 and 5, the core plate 510 is a flat plate member extending in the Z-axis direction. The tank member 511 is a member having a U-shaped cross-section in a direction perpendicular to the Z-axis direction. The core plate 510 is joined to the tank member 511 to close the opening portion of the tank member 511. The inner wall surface of the tank member 511 and the core plate define an inner space of the first tank 51. The inner space of the first tank 51 defines an inner passage through which the cooling water flows.

As shown in FIG. 4, the core plate 510 defines insertion holes 510a into which the one ends of the tubes 501 are inserted. The one ends of the tubes 501 inserted into the insertion holes 510a extend into the inner passage of the first tank 51. As a result, the inner passage of the first tank 51 is fluidly connected to the inner passages of the tubes 501.

The second tank 52 is connected to the other ends of the tubes 501. Similar to the first tank 51, the second tank 52 is also composed of a core plate 520 and a tank member 521. Since the structure of the second tank 52 is substantially the same as the structure of the first tank 51, detailed descriptions thereof will be omitted.

The first side plate 53 and the second side plate 54 are provided at both ends of the core 50, respectively. Each of the side plates 53 and 54 is a plate member having a U-shaped cross-section in a direction perpendicular to the X-axis direction. The side plates 53 and 54 are arranged such that opening portions of the U-shapes of the side plates 53 and 54 face outward of the core 50. One end of each of the side plates 53 and 54 is fixed to the first tank 51, and the other end of each of the side plates 53 and 54 is fixed to the second tank 52. The side plates 53 and 54 are provided to reinforce the core 50.

In the radiator 5, the cooling water whose temperature has increased by absorbing the heat of the internal combustion engine of the vehicle flows into the inner passage of the first tank 51 through an inlet defined in the first tank 51. The cooling water that has flowed into the inner passage of the first tank 51 is distributed to the tubes 501 of the core 50. In the core 50, heat exchange is performed between the cooling water flowing through the tubes 501 and the air flowing outside the tubes 501 and the cooling water is cooled. The cooling water that has flowed through the tubes 501 is collected in the second tank 52 and then discharged out of the second tank 52 through an outlet defined in the second tank 52.

Figure 6:
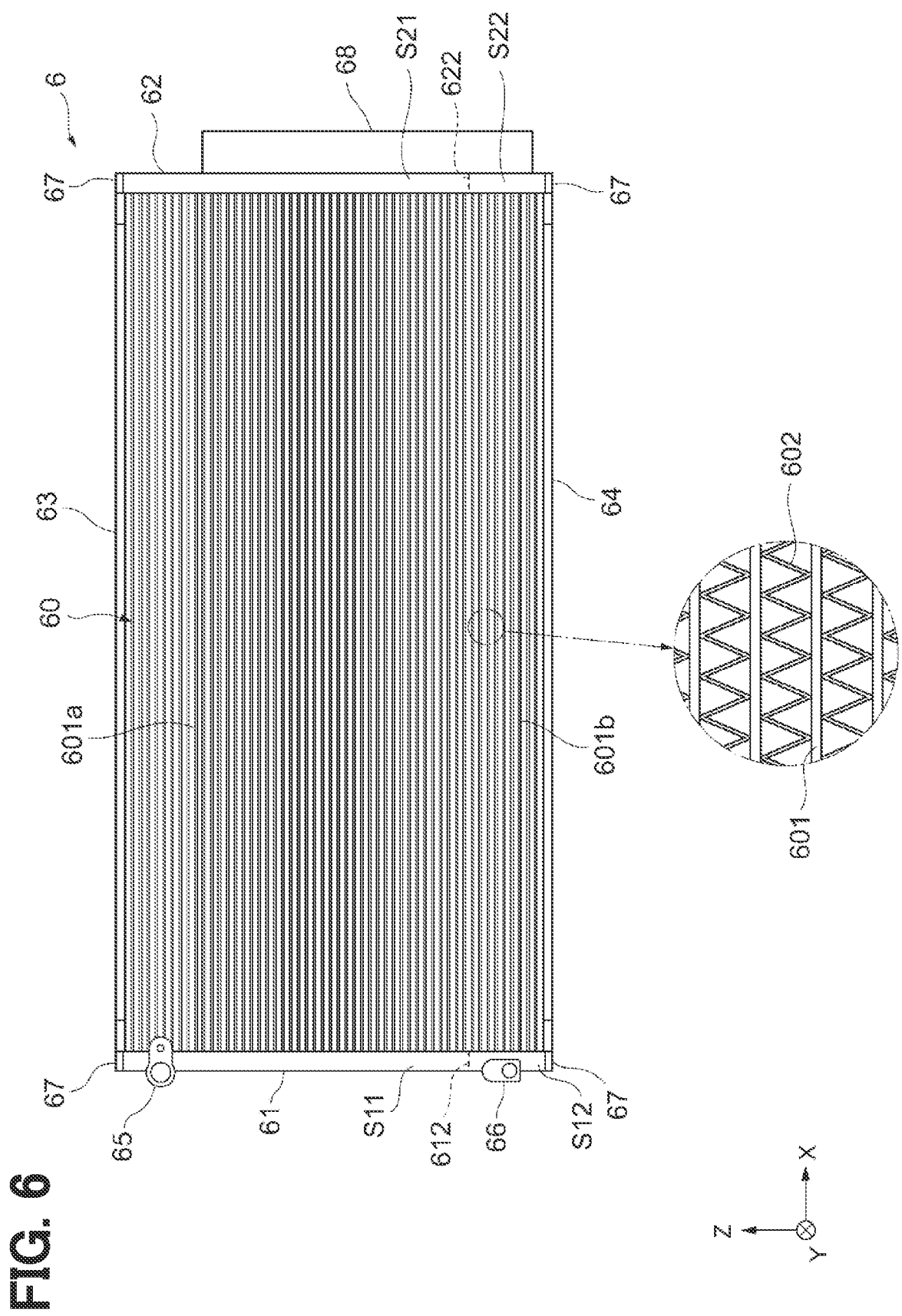
FIG. 6 is a front view of the condenser of the first embodiment.

As shown in FIG. 6, the condenser 6 has substantially the same structure as the radiator 5, and includes a core 60, a first tank 61, a second tank 62, a first side plate 63, and a second side plate 64.

Figure 7:
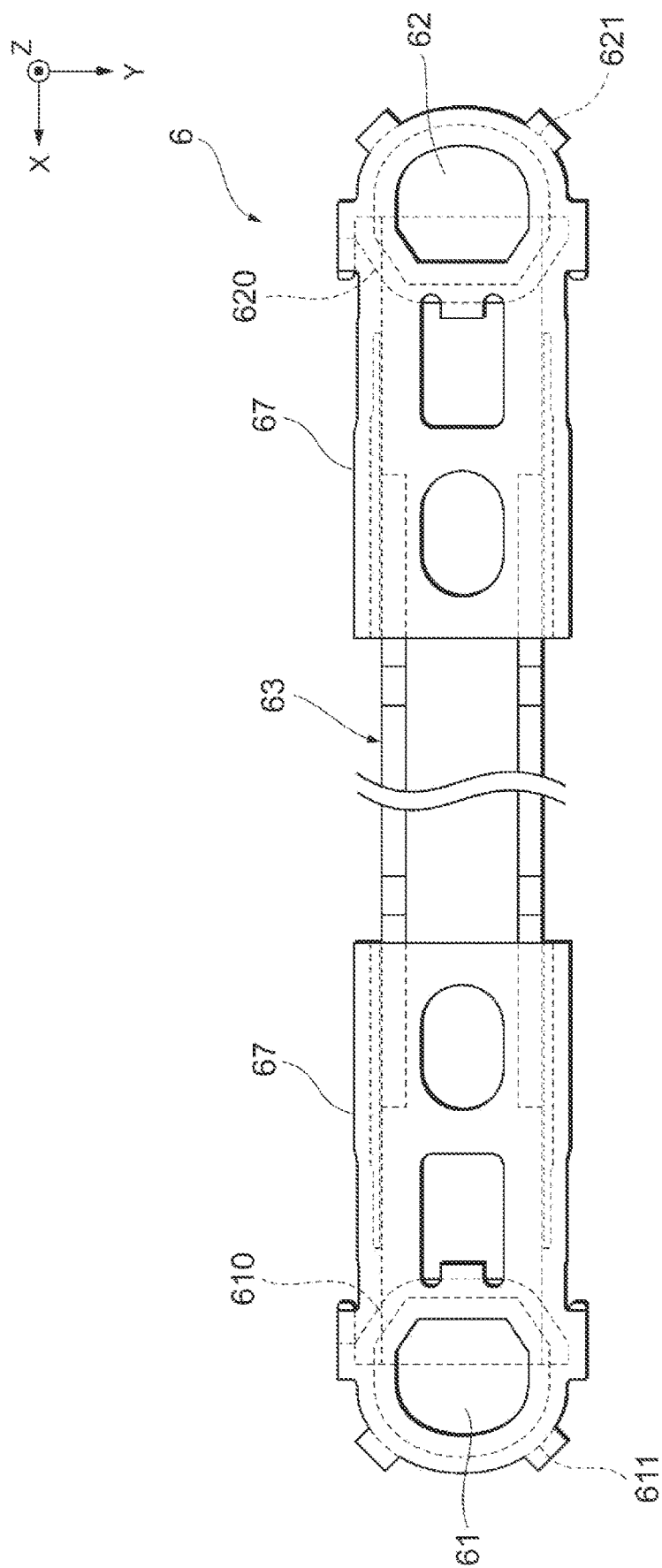
FIG. 7 is a plan view of the condenser of the first embodiment.

The core 60 is composed of multiple tubes 601 and multiple fins 602. As shown in FIG. 7, the first tank 61 is composed of a core plate 610 and a tank member 611. The second tank 62 is composed of a core plate 620 and a tank member 621. Since the structures and functions of these components are the same as or similar to the structures and functions of the corresponding components in the radiator 5, the differences between them will be mainly described.

As shown in FIG. 6, a partition 612 is provided inside the first tank 61. The partition 612 divides the inner space of the first tank 61 into a first inner passage S11 and a second inner passage S12. The first tank 61 defines an inlet 65 for introducing a fluid into the first inner passage S11 and an outlet 66 for discharging the fluid from the second inner passage S12. The first tank 61 defines openings at both ends and caps 67 are attached to the first tank 62 to close the openings.

A partition 622 is provided inside the second tank 62. The partition 622 divides the inner space of the second tank 62 into a first inner passage S21 and a second inner passage S22. The first inner passage S21 of the second tank 62 is fluidly in communication with the first inner passage S11 of the first tank 61 through the tubes 601a arranged in an upper portion of the core 60. The second inner passage S22 of the second tank 62 is fluidly in communication with the second inner passage S12 of the first tank 61 through the tubes 601b arranged in a lower portion of the core 60. The second tank 62 defines openings at both ends and caps 67 are attached to the second tank 62 to close the openings.

The condenser 6 further includes a cylindrical receiver 68 arranged adjacent to the second tank 62. The inner space of the receiver 68 is fluidly in communication with the first inner passage S21 and the second inner passage S22 of the second tank 62.

In the condenser 6, the refrigerant circulating through the refrigeration cycle of the air-conditioner of the vehicle flows into the first inner passage S11 of the first tank 61 through the inlet 65 defined in the first tank 61. The vapor-phase refrigerant that has flowed into the first inner passage S11 of the first tank 61 is distributed to the upper tubes 601a of the core 60. In the core 60, heat exchange between the vapor-phase refrigerant flowing through the upper tubes 601a and the air flowing outside of the upper tubes 601a is performed. As a result, the vapor-phase refrigerant is cooled and condensed to be a liquid-phase. The refrigerant that has flowed through the upper tubes 601a is collected in the first inner passage S21 of the second tank 62 and then flows into the receiver 68 to be separated into the vapor-phase refrigerant and the liquid-phase refrigerant. The liquid-phase refrigerant separated in the receiver 68 is distributed to the lower tubes 601b of the core 60 through the second inner passage S22 of the second tank 62. In the core 60, heat exchange between the liquid-phase refrigerant flowing through the lower tubes 601b and the air flowing outside the lower tubes 601b is performed. As a result, the liquid-phase refrigerant is sub-cooled. The refrigerant that has flowed through the lower tubes 601b is collected in the second inner passage S12 of the first tank 61 and then discharged to the outside through the outlet 66 of the first tank 61.

The radiator 5 and the condenser 6 are arranged as shown in FIG. 5. As shown in FIG. 5, the radiator 5 and the condenser 6 are arranged to define a predetermined gap in the airflow direction Y. The shutter device 10 shown in FIG. 2 is arranged in the gap defined between the radiator 5 and the condenser 6.

As shown in FIG. 5, the first protrusion 214 formed on the upper frame piece 210 of the first frame body 21 protrudes from the upper frame piece 210 toward the first side plate 53 of the radiator 5. The surface of the first protrusion 214 is in contact with the first side plate 53 of the radiator 5. Further, the second protrusion 215 formed on the upper frame piece 210 protrudes from the upper frame piece 210 toward the first side plate 63 of the condenser 6. The surface of the second protrusion 215 is in contact with the first side plate 63 of the condenser 6. More specifically, the surface of the second protrusion 215 is in contact with a portion of the first side plate 63 of the condenser 6 that is not covered by the cap 67. With such a structure, the upper frame piece 210 is interposed between the first side plate 53 of the radiator 5 and the first side plate 63 of the condenser 6 through the first protrusion 214 and the second protrusion 215.

Although not shown, the first protrusion 214 formed on the lower frame piece 211 of the first frame body 21 protrudes from the lower frame piece 211 toward the second side plate 54 of the radiator 5. The surface of the first protrusion 214 is in contact with the second side plate 54 of the radiator 5. Further, the second protrusion 215 formed on the lower frame piece 211 protrudes from the lower frame piece 211 toward the second side plate 64 of the condenser 6. The surface of the second protrusion 215 is in contact with the second side plate 64 of the condenser 6. The lower frame piece 211 is interposed between the second side plate 54 of the radiator 5 and the second side plate 64 of the condenser 6 through the first protrusion 214 and the second protrusion 215.

As shown in FIG. 5, the third protrusion 216 formed on the right frame piece 212 of the first frame body 21 protrudes from the right frame piece 212 into a gap between the second tank 52 of the radiator 5 and the second tank 62 of the condenser 6. The third protrusion 216 is interposed between the second tank 52 of the radiator 5 and the second tank 62 of the condenser 6. More specifically, the third protrusion 216 is interposed between the core plate 520 of the second tank 52 of the radiator 5 and the tank member 621 of the second tank 62 of the condenser 6.

Although not shown, the third protrusion 216 formed on the left frame piece 213 of the first frame body 21 is interposed between the core plate 510 of the first tank 51 of the radiator 5 and the tank member 611 of the first tank 61 of the condenser 6.

According to the shutter device 10 of this embodiment described above, advantages described in the following (1) to (5) can be obtained.

(1) When the frame bodies 21 to 23 are elastically deformed due to vibrations of the vehicle or the like, the protrusions 214 to 216 come into contact with the remaining portion of the radiator 5 other than the core 50 and the remaining portion of the condenser 6 other than the core 60. Thus, the frame bodies 21 to 23 are less likely to be further deformed. Further, since the frame bodies 21 to 23 are restricted from being deformed, the blades 30 that are rotatably supported by the frame bodies 12 to 23 are also less likely to be deformed. As a result, it is possible to restrict the frame bodies 21 to 23 and the blades 30 from coming into contact with the core 50 of the radiator 5 and the core 60 of the condenser 6.

(2) When the blades 30 are closed, pressure of the air introduced from the grill opening 2 acts on the blades 30, so that the frame bodies 21 to 23 are easily elastically deformed in the airflow direction Y. Such elastic deformation of the frame bodies 21 to 23 may cause the blades 30 to come into contact with the core 60 of the radiator 5. In this respect, in the shutter device 10 of the present embodiment, the first protrusions 214 protrude from the upper frame piece 210 or the lower frame piece 211 of the first frame body 21 in a direction parallel to the airflow direction Y. More specifically, the first protrusions 214 protrude from the first frame body 21 toward the side plates 53 and 54 of the radiator 5. According to such a configuration, even when the frame bodies 21 to 23 are elastically deformed in the airflow direction Y, the first protrusions 214 come into contact with the side plates 53 and 54 of the radiator 5. Thus, the frame bodies 21 to 23 are less likely to be further deformed in the airflow direction Y. As a result, the blades 30 are less likely to be further deformed in the airflow direction Y and it is possible to restrict the frame bodies 21 to 23 and the blades 30 from coming into contact with the core 50 of the radiator 5.

(3) The first protrusions 214 are in contact with the remaining portion of the radiator 5 other than the core 50. According to such a configuration, compared to a case where a gap is defined between the first protrusion 214 and the radiator 5, the deformation of the frame bodies 21 to 23 toward the radiator 5 is suppressed more effectively. Thus, the frame bodies 21 to 23 and the blades 30 are further restricted from coming into contact with the core 50 of the radiator 5. Further, since the second protrusions 215 are in contact with the remaining portion of the condenser 6 other than the core 60, the frame bodies 21 to 23 and the blades 30 are further restricted from coming into contact with the core 60 of the condenser 6.

Figure 8:
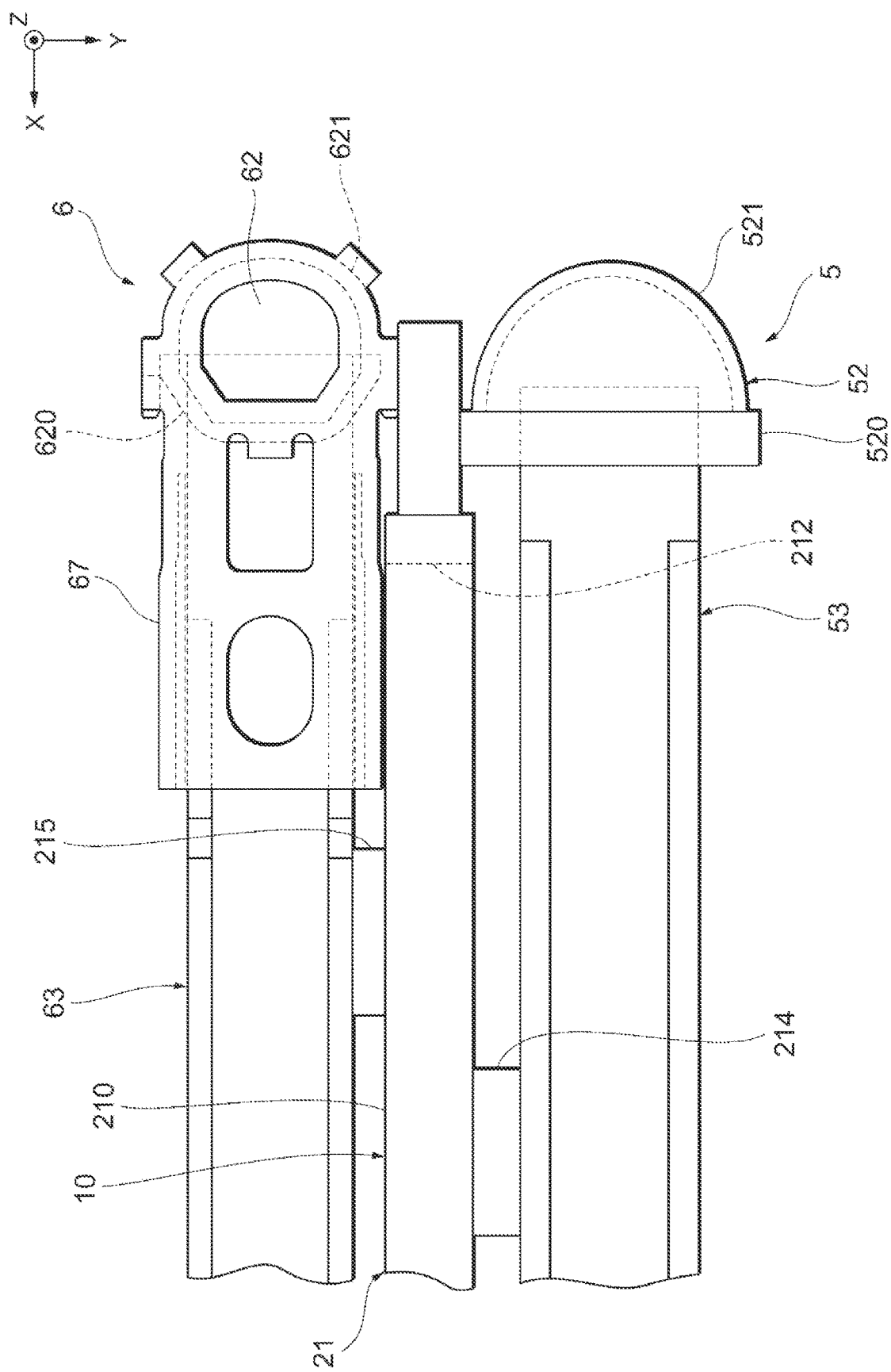
FIG. 8 is a plan view of the radiator, the condenser, and a shutter device of a modification of the first embodiment.

(4) The first protrusions 214 and the second protrusions 215 are aligned in the airflow direction Y. According to such a configuration, for example, compared to a case where the first protrusion 214 is offset from the second protrusion 215 in the X-axis direction as shown in FIG. 8, the deformation of the first frame body 21 is surely suppressed. Thus, the frame bodies 21 to 23 and the blades 30 are further restricted from coming into contact with the core 50 of the radiator 5 and the core 60 of the condenser 6. However, the shutter device 10 of the present embodiment may adopt the structure shown in FIG. 8.

(5) The third protrusions 216 protrude from the right frame piece 212 and the left frame piece 213, respectively, in a direction perpendicular to the airflow direction Y. The third protrusions 216 formed on the left frame piece 213 are interposed between the core plate 510 of the first tank 51 of the radiator 5 and the tank member 611 of the first tank 61 of the condenser 6. The third protrusion 216 formed on the right frame piece 212 is interposed between the core plate 520 of the second tank 52 of the radiator 5 and the tank member 621 of the second tank 62 of the condenser 6. That is, the third protrusion 216 is interposed between the remaining portions of the radiator 5 and the condenser 6 other than the cores 50 and 60. According to such a configuration, the deformation of the right frame piece 212 and the left frame piece 213 of the first frame body 21 can be suppressed, so that the frame bodies 21 to 23 and the blades 30 are further restricted from coming into contact with the core 50 of the radiator 5 and the core 60 of the condenser 6.

Second Embodiment

Next, a shutter device 10 of the second embodiment will be described. Hereinafter, differences from the shutter device 10 of the first embodiment are mainly described.

Figure 9:
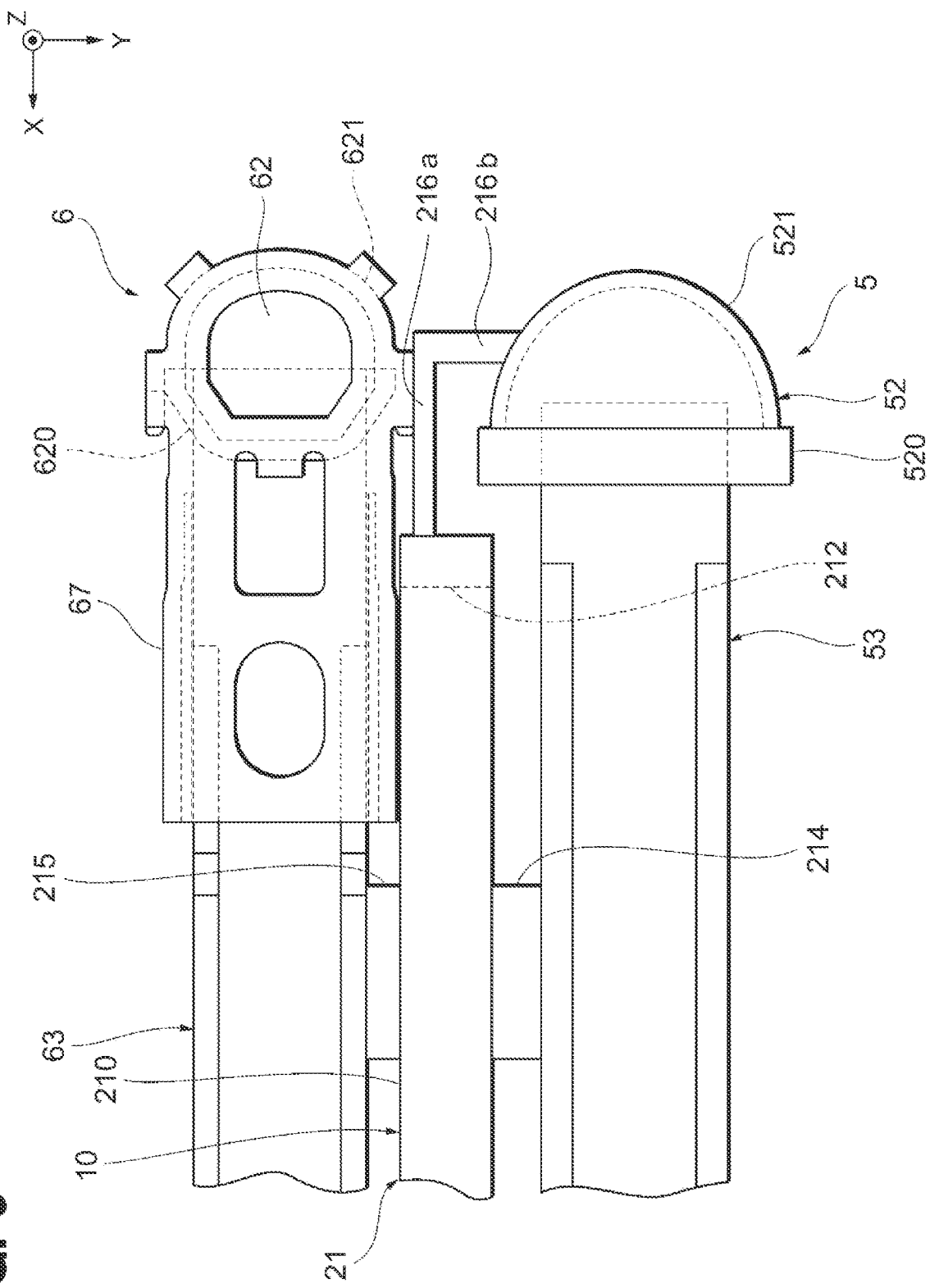
FIG. 9 is a plan view of the radiator, the condenser, and a shutter device of the second embodiment.

As shown in FIG. 9, in the shutter device 10 of the present embodiment, the third protrusion 216 includes a first portion 216a and a second portion 216b.

The first portion 216a extends in a direction parallel to the X-axis direction from the right frame piece 212 of the first frame body 21. The first portion 216a has an outer surface facing in a direction opposite to the airflow direction Y. The outer surface of the first portion 216a is in contact with the tank member 621 of the second tank 62 of the condenser 6.

The second portion 216b bends from the tip end of the first portion 216a at a substantially right angle in the airflow direction Y. The tip end of the second portion 216b is in surface contact with the outer surface of the tank member 521 of the second tank 52 of the radiator 5.

As described above, the first portion 216a of the third protrusion 216 is in surface contact with the tank member 621 of the second tank 62 of the condenser 6, and the second portion 216b of the third protrusion 216 is in surface contact with the tank member 521 of the second tank 52 of the radiator 5. Thus, the third protrusion 216 is interposed between the condenser 6 and the radiator 5.

The left frame piece 213 of the first frame body 21 also includes the third protrusion 216 having the same shape as the third protrusion 216 of the right frame piece 212. In the third protrusion 216 formed on the left frame piece 213, the first portion 216a is in surface contact with the tank member 611 of the first tank 61 of the condenser 6 and the second portion 216b is in surface contact with the tank member 511 of the first tank 51 of the radiator 5. Thus, the third protrusion 216 is interposed between the condenser 6 and the radiator 5.

According to the shutter device 10 of the present disclosure, the advantage (6) can be obtained in addition to the above-described advantages (1) to (4).

(6) The third protrusion 216 formed on the right frame piece 212 is interposed between the tank member 521 of the second tank 52 of the radiator 5 and the tank member 621 of the second tank 62 of the condenser 6. The third protrusion 216 formed on the left frame piece 213 is interposed between the tank member 511 of the first tank 51 of the radiator 5 and the tank member 611 of the first tank 61 of the condenser 6. Even in such a configuration, the deformation of the right frame piece 212 and the left frame piece 213 of the first frame body 21 can be suppressed, so that the frame bodies 21 to 23 and the blades 30 are further restricted from coming into contact with the core 50 of the radiator 5 and the core 60 of the condenser 6.

Other Embodiments

The embodiments described above can be also implemented in the following forms.

The shutter device 10 of each embodiment is not limited to the one arranged between the radiator 5 and the condenser 6, and may be any one arranged between any two heat exchangers. For example, when an intake air cooler for cooling the intake air of the internal combustion engine of the vehicle and the condenser are arranged side by side in the airflow direction Y, the shutter device may be arranged between them.

The shutter device 10 of each embodiment may be provided with at least one of the first protrusion 214, the second protrusion 215, and the third protrusion 216.

A gap may be defined between the first protrusion 214 and the side plate 53, 54 of the radiator 5. Similarly, a gap may be defined between the second protrusion 215 and the side plate 63, 64 of the condenser 6. Further, a gap may be defined between the third protrusion 216 and the tank 51, 52 of the radiator 5, and between the third protrusion 216 and the tank 61, 62 of the condenser 6.

The shutter device 10 of each embodiment adopts the multiple blades 30 as the opening-closing portion for opening or closing the inner space defined the frame 20. However, the opening-closing portion may be a screen.

The present disclosure is not limited to the specific examples described above. The specific examples described above which have been appropriately modified in design by those skilled in the art are also encompassed in the scope of the present disclosure so far as the modified specific examples have the features of the present disclosure. Each element included in each of the specific examples described above, and the placement, condition, shape, and the like of the element are not limited to those illustrated, and can be modified as appropriate. The combinations of the elements in each of the specific examples described above can be changed as appropriate, as long as it is not technically contradictory.

What is claimed is:

1. A shutter device comprising:
a frame disposed between a first heat exchanger and a second heat exchanger and defining an inner space through which air introduced from a grill opening of a vehicle flows in an airflow direction, each of the first heat exchanger and the second heat exchanger having a core in which heat exchange is performed and a remaining portion other than the core;
an opening-closing portion configured to selectively open and close the inner space of the frame; and
a protrusion protruding, in a direction parallel to the airflow direction, from the frame toward the remaining portion of at least one of the first heat exchanger or the second heat exchanger, wherein
the first heat exchanger is located upstream of the second heat exchanger in the airflow direction,
the protrusion includes:
a first protrusion protruding from the frame toward the second heat exchanger; and
a second protrusion protruding from the frame toward the first heat exchanger,
the first protrusion is in contact with the second heat exchanger and the second protrusion is in contact with the first heat exchanger,
the core is formed by a plurality of tubes that are stacked with each other in a tube stacking direction,
each of the first heat exchanger and the second heat exchanger includes a side plate disposed at an end of the core in the tube stacking direction to reinforce the core,
the first protrusion is in contact with the side plate of the second heat exchanger, and
the second protrusion is in contact with the side plate of the first heat exchanger.

2. The shutter device according to claim 1, wherein the first protrusion and the second protrusion are arranged in the airflow direction.

3. The shutter device according to claim 1, wherein the first protrusion and the second protrusion are offset from each other in a direction perpendicular to the airflow direction.

4. The shutter device according to claim 1, wherein the first heat exchanger is one of a radiator configured to cool a cooling water circulating through the vehicle, a condenser of a refrigerant cycle mounted in the vehicle, and an intake air cooler configured to cool an intake air of an internal combustion engine of the vehicle, and
the second heat exchanger is another one of the radiator configured to cool the cooling water circulating through the vehicle, the condenser of the refrigerant cycle mounted in the vehicle, and the intake air cooler configured to cool the intake air of the internal combustion engine of the vehicle.

5. The shutter device according to claim 1, wherein the opening-closing portion is a plurality of blades that are rotatably supported by the frame and configured to selectively open and close the inner space of the frame by rotating.

6. The shutter device according to claim 1, wherein the first protrusion is less than a full width of the frame, and
the second protrusion is less than the full width of the frame.

7. The shutter device according to claim 1, wherein the first protrusion includes a plurality of protrusions arranged in the tube stacking direction, and
the second protrusion includes a plurality of protrusions arranged in the tube stacking direction.

8. The shutter device according to claim 7, wherein a clearance between the plurality of protrusions of the first protrusion is larger than a width of the first protrusion in the tube stacking direction, and
a clearance between the plurality of protrusions of the second protrusion is larger than a width of the second protrusion in the tube stacking direction.

9. The shutter device according to claim 1, wherein a protrusion length of the first protrusion is longer than a protrusion length of the second protrusion in the airflow direction.

10. The shutter device according to claim 1, wherein a length of the first protrusion in the tube stacking direction is less than a boundary of the first heat exchanger and a boundary of the second heat exchanger, and
a length of the second protrusion in the tube stacking direction is less than the boundary of the first heat exchanger and the boundary of the second heat exchanger.

11. The shutter device according to claim 1, wherein the protrusion further includes:
a third protrusion protruding from the frame in a direction perpendicular to the airflow direction.

12. The shutter device according to claim 11, wherein the first protrusion includes a plurality of protrusions arranged in the tube stacking direction,
the second protrusion includes a plurality of protrusions arranged in the tube stacking direction, and
the third protrusion includes a plurality of protrusions arranged in a height direction perpendicular to the tube stacking direction and the airflow direction.

13. A shutter device comprising:
a frame disposed between a first heat exchanger and a second heat exchanger and defining an inner space through which air introduced from a grill opening of a vehicle flows in an airflow direction, each of the first heat exchanger and the second heat exchanger having a plurality of tubes that are stacked with each other in a tube stacking direction, a core plate to which ends of the plurality of tubes are connected, and a tank that defines a passage through which a fluid flows together with the core plate;
an opening-closing portion configured to selectively open and close the inner space of the frame; and
a protrusion protruding, in a direction perpendicular to the airflow direction, from the frame to be interposed between the core plate of the first heat exchanger and the tank of the second heat exchanger.

14. The shutter device according to claim 13, wherein the protrusion includes a plurality of protrusions arranged in a height direction perpendicular to the tube stacking direction and the airflow direction.

15. A shutter device comprising:
a frame disposed between a first heat exchanger and a second heat exchanger and defining an inner space through which air introduced from a grill opening of a vehicle flows in an airflow direction, each of the first heat exchanger and the second heat exchanger having a plurality of tubes that are stacked with each other in a tube stacking direction, a core plate to which ends of the plurality of tubes are connected, and a tank that defines a passage through which a fluid flows together with the core plate;

an opening-closing portion configured to selectively open and close the inner space of the frame; and a protrusion protruding, in a direction perpendicular to the airflow direction, from the frame to be interposed between the tank of the first heat exchanger and the tank of the second heat exchanger.

16. The shutter device according to claim 15, wherein the protrusion includes a plurality of protrusions arranged in a height direction perpendicular to the tube stacking direction and the airflow direction.

* * * * *